(12) United States Patent
Speight et al.

(10) Patent No.: US 8,140,768 B2
(45) Date of Patent: Mar. 20, 2012

(54) JUMP STARTING PREFETCH STREAMS ACROSS PAGE BOUNDARIES

(75) Inventors: William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 12/024,632

(22) Filed: Feb. 1, 2008

(65) Prior Publication Data

US 2009/0198909 A1    Aug. 6, 2009

(51) Int. Cl.
*G06F 12/08* (2006.01)
(52) U.S. Cl. .................... 711/137; 711/E12.057
(58) Field of Classification Search ............ 711/137, 711/E12.057
See application file for complete search history.

(56) References Cited

U.S. PATENT DOCUMENTS

| | | | |
|---|---|---|---|
| 5,555,435 A | 9/1996 | Campbell | |
| 5,764,271 A | 6/1998 | Donohue | |
| 6,075,617 A | 6/2000 | Fischer | |
| 6,455,322 B1 | 9/2002 | Kirk | |
| 6,819,795 B1 | 11/2004 | Chiu | |
| 6,992,785 B1 | 1/2006 | Chatcavage | |
| 7,061,267 B2 | 6/2006 | Campbell | |
| 2006/0248279 A1 | 11/2006 | Al-Sukhni | |
| 2008/0016330 A1* | 1/2008 | El-Essawy et al. | 712/225 |

* cited by examiner

*Primary Examiner* — Yong Choe
(74) *Attorney, Agent, or Firm* — Yudell Isidore Ng Russell PLLC (57) ABSTRACT

A method, processor, and data processing system for enabling utilization of a single prefetch stream to access data across a memory page boundary. A prefetch engine includes an active streams table in which information for one or more scheduled prefetch streams are stored. The prefetch engine also includes a victim table for storing a previously active stream whose next prefetch crosses a memory page boundary. The scheduling logic issues a prefetch request with a real address to fetch data from the lower level memory. Then, responsive to detecting that the real address of the stream's next sequential prefetch crosses the memory page boundary, the prefetch engine determines when the first prefetch stream can continue across the page boundary of the first memory page (via an effective address comparison). The PE automatically reinserts the first prefetch stream into the active stream table to jump start prefetching across the page boundary.

25 Claims, 4 Drawing Sheets

JUMP STARTING PREFETCH STREAMS ACROSS PAGE BOUNDARIES

GOVERNMENT RIGHTS

This invention was made with United States Government support under Agreement No. HR0011-07-9-0002 awarded by DARPA. The Government has certain rights in the invention.

BACKGROUND OF THE INVENTION

1. Technical Field

The present invention relates generally to data processing systems and more particularly to fetching data for utilization during data processing. Still more particularly, the present invention relates to data prefetching operations in a data processing system.

2. Description of Related Art

Conventional computer systems are designed with a memory hierarchy comprising different memory devices with increasing access latency the further the device is away from the processor. The processors typically operate at a very high speed and are capable of executing instructions at such a fast rate that it is necessary to prefetch a sufficient number of cache lines of data from lower level (and/or system memory) to avoid the long latencies when a cache miss occurs. This prefetching ensures that the data is ready and available when needed for utilization by the processor.

Conventional prefetch operations involve a prefetch engine that monitors accesses to the L1 cache and, based on the observed patterns, issues requests for data that is likely to be referenced in the future. If the prefetch request succeeds, the processor's request for data will be resolved by loading the data from the L1 cache on demand, rather than the processor stalling while waiting for the data to be fetched/returned from lower level memory.

In conventional processor configurations, the effective address of a prefetch instruction (or a memory access instruction, such as a demand load) passes through a translation mechanism, such as a translation lookaside buffer (TLB), which translates the effective addresses into corresponding real addresses. The TLB then passes the real addresses to the prefetch engine to execute the prefetch at the lower level memory.

Within lower level memory, data are stored in memory blocks and addressed by real addresses. Sequential data are typically stored in sequential memory blocks, which are accessed by their corresponding sequential real addresses. Also, a configurable number of these sequential memory blocks are stored in memory pages, which pages are separated by known address boundaries. While sequentially adjacent pages have sequential real address assignments from page-to-page, an executing program's allocation of effective addresses (for processor operations) does not necessarily match up to a same sequential allocation. Programs that have sequential streams of data typically access the data in a linear manner in the effective address space. Thus, it is quite common for a pair of sequential effective addresses at a page boundary to correspond to real addresses on pages that are not sequentially adjacent to each other (i.e., the real address are not sequential).

Typically, when prefetching data, the prefetch engines utilize some set sequence to identify a stream of cache lines to be fetched and a stride pattern. A "prefetch stream" may refer to a stream of addresses (and blocks associated with those addresses) that are prefetched into the cache as a result of the detected prefetch pattern. When prefetching data using prefetch streams, the memory controller sources the data sequentially from a memory page using sequential real addresses. The sequential real addresses may however, cross page boundaries, resulting in the prefetch engine stopping the stream. The prefetch engine stops the stream because the prefetch engine has no way of determining if the next data block found sequentially in the physical address space is mapped to a correspondingly sequential block in the effective address space. To reduce potentially polluting the cache with non-sequential prefetches, the prefetcher will stop issuing prefetch requests at each physical page boundaries.

When the real addresses within a stream crosses over the boundary of a physical page of memory, the prefetch engine stops the stream at the boundary because the effective addresses that target adjacent memory pages are not necessarily assigned in sequence. If the prefetch engine were to continue across the boundary, based on the sequential effective addresses, the prefetch engine may begin prefetching data that does not really belong to the current stream. Thus, with conventional implementations of prefetch engines, the prefetch engine stops a stream when the stream crosses a page boundary. Then, the prefetch engine may later detect/initiate a new, different stream to prefetch the remaining data that will be demanded by the processor.

SUMMARY OF THE INVENTION

Disclosed are a method and data processing system for enabling utilization of a single prefetch stream to access data across a memory page boundary. A prefetch engine (PE) includes an active streams table in which information for one or more scheduled prefetch streams are stored. The prefetch engine also includes a victim table for storing a previously active stream whose next prefetch crosses a memory page boundary. The scheduling logic issues a prefetch request with a real address to fetch data from the lower level memory. Then, responsive to detecting that the real address of the stream's next sequential prefetch crosses the memory page boundary, the prefetch engine determines when the first prefetch stream can continue across the page boundary of the first memory page (via an effective address comparison). The PE automatically reinserts the first prefetch stream into the active stream table to jump start prefetching across the page boundary.

All features and advantages of the present invention will become apparent in the following detailed written description.

BRIEF DESCRIPTION OF THE DRAWINGS

The illustrative embodiments will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and data processing system for jump starting stream prefetching after encountering a memory page boundary.

Figure 1:
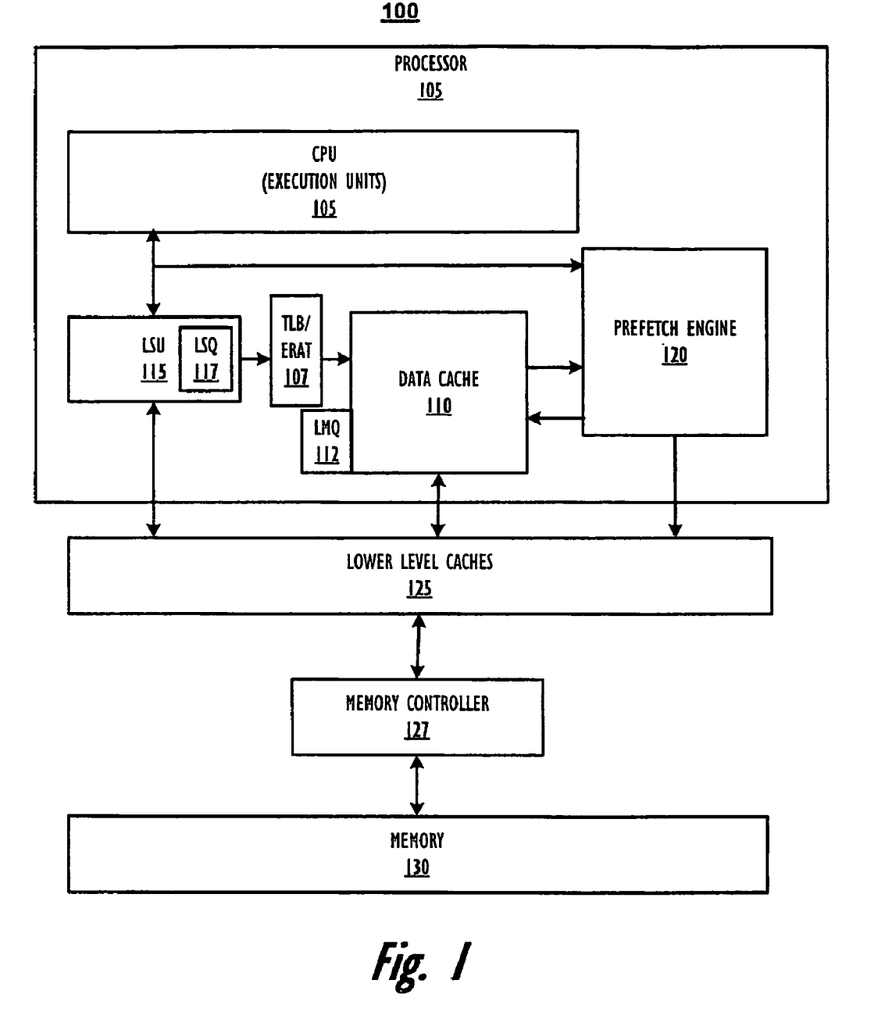
FIG. 1 is a block diagram of a data processing system with components utilized to jump start completion of a data prefect stream across a page boundary in accordance with one embodiment.

Referring now to the drawings and in particular to FIG. 1, there is depicted a block diagram of a data processing system, within which the various features of the invention may be implemented, in accordance with the described embodiments. Data processing system 100 comprises at least one central processing unit (CPU) 105 (or processor). CPU 105 includes various execution units, registers, buffers, memories, and other functional units. More particularly, CPU 105 includes various execution units that request/demand and consume data. In one embodiment of the present invention, CPU 105 is one of the PowerPC® line of microprocessors, which operates according to reduced instruction set computing (RISC) techniques.

CPU 105 connects to and communicates with a memory hierarchy that includes an L1 data cache 110, one (or more) lower level caches 125, and memory 130 and associated memory controller 127. Memory controller 127 controls accesses to memory 130. As will become clear below, L1 data cache 110 serves as a prefetch buffer for data (and/or data streams) that are pre-fetched. In the illustrative embodiment, L1 data cache has a corresponding load miss queue (LMQ) 112, which the cache utilizes to save information about ongoing prefetch requests. Lower level caches 125 may comprise a single level two (L2) cache or multiple other sequentially numbered lower levels, e.g., L3, L4. In addition to the illustrated memory hierarchy, data processing system 130 may also comprise additional storage devices that form a part of memory hierarchy from the perspective of CPU 105. The storage device may be one or more electronic storage media such as a floppy disk, hard drive, CD-ROM, or digital versatile disk (DVD). CPU 105 communicates with each of the above devices within the memory hierarchy by various means, including via busses and/or direct channels.

Load store unit (LSU) 115, coupled to CPU 105, includes a load/store queue (LSQ) 117, and issues memory access operations (loads and stores) that retrieves prefetched data or causes the data to be fetched from the memory subsystem. A prefetch engine (PE) 120 is coupled to LSU 115 via a translation mechanism 107, indicated as a translation lookaside buffer (TLB) or an effective to real address table (ERAT). PE 120 includes logic that enables the various enhanced prefetching features of the embodiments described herein. As utilized herein, the term prefetching refers to the method by which data that is stored in one memory location of the memory hierarchy (e.g., system memory 130) is transferred to a higher level memory location (e.g., L1 data cache 110) that is closer (yields lower access latency) to the CPU 105, before the CPU 105 actually requests/demands the data. More specifically, prefetching as described hereinafter, refers to the early retrieval of data from lower level memory 130 to the data cache 110 before the CPU 105 issues a demand for the specific data being returned.

In a software-based prefetch implementation, during normal execution of program code, CPU 105 encounters and executes/issues a prefetch instruction before the CPU executes a load instruction associated with the same data. The prefetch instruction instructs the PE 120 to prefetch the data from the lower memory location and to store the data in the data cache 110. The translation mechanism 107 translates the effective addresses within the prefetch instruction (or memory access operation which triggers a subsequent prefetch) into corresponding real addresses and forwards the prefetch instruction (or memory access operation) with the real addresses to the PE 120. Logic within the PE 120 then determines a prefetch stream and schedules the prefetch stream to prefetch multiple sequential blocks of data. The CPU 115 subsequently executes the corresponding load (or other memory access) instruction that instructs the LSU 115 to load the data from the data cache 110 into one of the CPU's execution registers. To load the data, the LSU 115 issues a memory access request (e.g., a read/write) to the data cache 110.

Those skilled in the art will further appreciate that while a particular configuration of data processing system 100 is illustrated and described, it is understood that other configurations may be possible, utilizing functional components within and/or associated with the data processing system to achieve the same functional results. The illustrative embodiments contemplates that all such configurations fall within the scope of the embodiments and their equivalents.

Also, while the illustrative embodiments have been, and will continue to be, described in the context of a fully functional data processing system, those skilled in the art will appreciate that the software aspects of an illustrative embodiment are capable of being distributed as a program product in a variety of forms, and that an illustrative embodiment applies equally regardless of the particular type of media used to actually carry out the distribution.

Also, it is understood that the use of specific parameter names are for example only and not meant to imply any limitations on the invention. The invention may thus be implemented with different nomenclature/terminology utilized to described the various parameters (e.g., logic, tables, and the like), without limitation.

Figure 2:
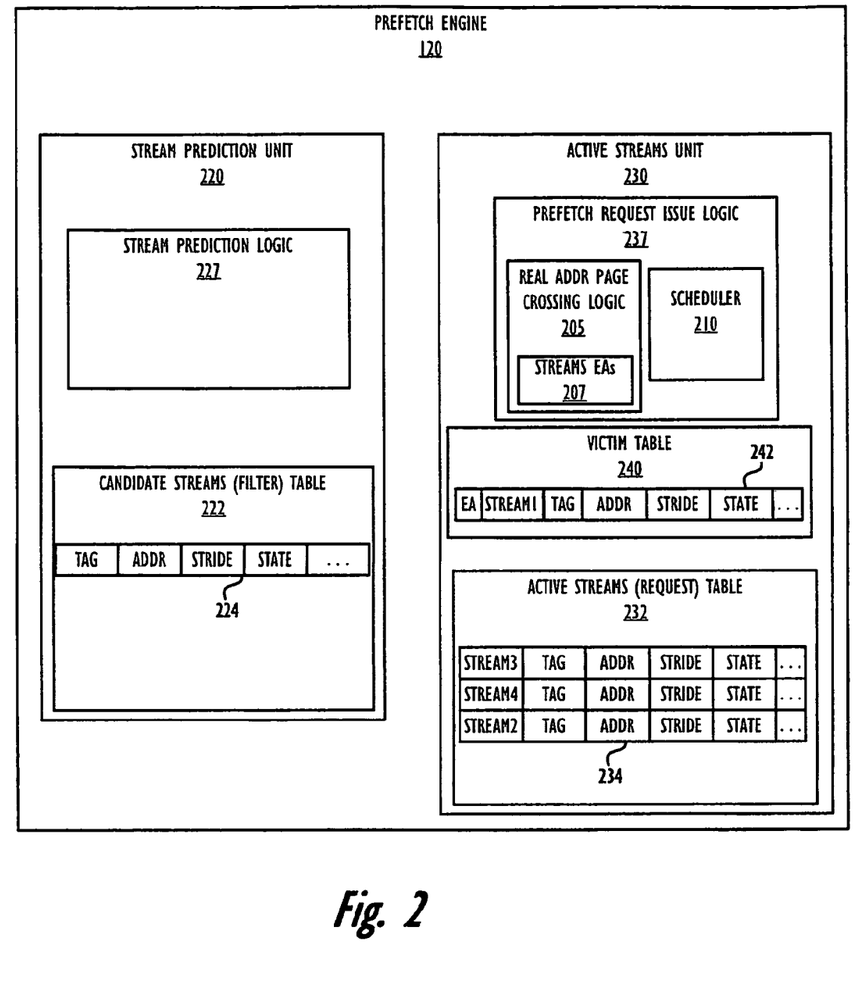
FIG. 2 is a block diagram depicting internal components of the prefetch engine of FIG. 1, including a victim table and associated logic, according to one embodiment.

FIG. 2 is a block diagram illustrating additional components of an example prefetch engine (PE) 120 utilized for establishing prefetch streams, scheduling of active prefetch streams, as well as enabling a prefetch stream to quickly resume fetching data after the stream's real address crosses a memory page boundary, where the real addresses of the new page corresponds to the next sequential effective addresses of the prefetch stream. PE 120 includes reference/stream prediction unit 220, which includes reference prediction table 222 and reference/stream prediction logic 227. Stream prediction table 222 includes one or more entries of historical data 224 of previous references, which may be utilized by PE 120 to identify new streams for prefetching. Reference/stream prediction logic 227 utilizes the historical data entries 224 to predict future prefetch streams based on issued references. Specifically, the stream prediction logic 227 utilizes reference prediction table 222 to store a certain number of previous references in each entry and initiate an active stream in the issue logic (237) if the prediction logic 227 detects some pattern.

PE 120 also comprises active streams unit 230, which includes active streams table 232 and prefetch request issue logic 237. Also, in accordance with the described embodiments, PE 120 comprises a victim table 240. PE 120 and specifically active streams table 232 concurrently maintains information about multiple, independent prefetch streams. Three entries of active streams information (i.e., show collectively as entries 234 of active prefetch stream information) are illustrated within active streams table 232, representing different streams that the PE 120 currently prefetches.

According to the embodiments described herein, prefetch request issue logic 237 sends out prefetch requests at times determined by a set schema that enables the requested data of each stream to arrive at the data cache prior to the time (or just at the time) the CPU issues a load demand for the particular data. The scheduled prefetch issue times may be based on a round robin scheme, a FIFO queue, or some dynamic allocation, such as priority-based round robin scheme. The actual scheduling scheme is not directly relevant to the description or implementation of the core features provided by the illustrative embodiments.

In the depicted embodiment, prefetch request issue logic 237 comprises (or is represented by) two different functional logic, first logic (or scheduling logic) 210 and second logic (or real address page crossing-RAPC-logic) 205. First and second logic together enable the scheduling of a prefetch stream across a memory page boundary as well as other functions performed by the PE 120. Scheduling logic 210 performs the basic scheduling of the multiple streams for issuance to the memory subsystem. Second RAPC logic 210 operates in conjunction with victim table 240 to resume processing the same prefetch stream when the RAPC logic 210 determines that the stream may cross the memory page boundary. As described in greater detail below, one of scheduling logic 210 and RAPC logic 205 also suspends the stream's prefetches once the stream prefetch reaches the memory page boundary.

As utilized herein, the term logic 122 refers to one or a combination of software utility and/or pseudo code and hardware registers and components. Also, logic may refer to a singular construct or a plural construct, such that multiple different logic within the PE 120 perform different parts of the functions involved in scheduling the streams and the other functions described herein. The logic operates to ensure that data prefetch operation for a particular stream completes (i.e., returns the fetched cache line(s) to the data cache 115) at substantially the time (or clock cycle) at which the processor issues a demand for that cache line data. The functionality provided by the described and illustrated embodiments enables the data prefetch mechanisms within PE 120 to enable a single stream prefetch to continue fetching data beyond a memory page boundary, without requiring a restart or reconfiguring of the prefetch stream for the new memory page.

The RAPC logic 205 responds to detection of a page boundary by removing the prefetch stream from the active streams table 232. Each entry within the active streams table includes a real address (Addr) entry along with other stream information. The Addr entry is the real address corresponding to an effective address within the EA table 207 (translated by the translation mechanism).

In one embodiment, RAPC logic maintains an EA table 207 of the effective addresses corresponding to each of the active stream prefetch's real addresses. The PE 120 receives the initial EAs from the processor operations when the processor issues the initial prefetch instruction (or memory access operation) that results in the creation of the stream prefetch. RAPC logic 205 removes the stream information (of the stream that encountered the memory page boundary) from the active streams table 232 and places the stream information in the victim table 240, maintained by the RAPC logic 205. The RAPC logic 205 then assigns/tags the corresponding effective address to the stream information in the victim table 240.

Figure 3:
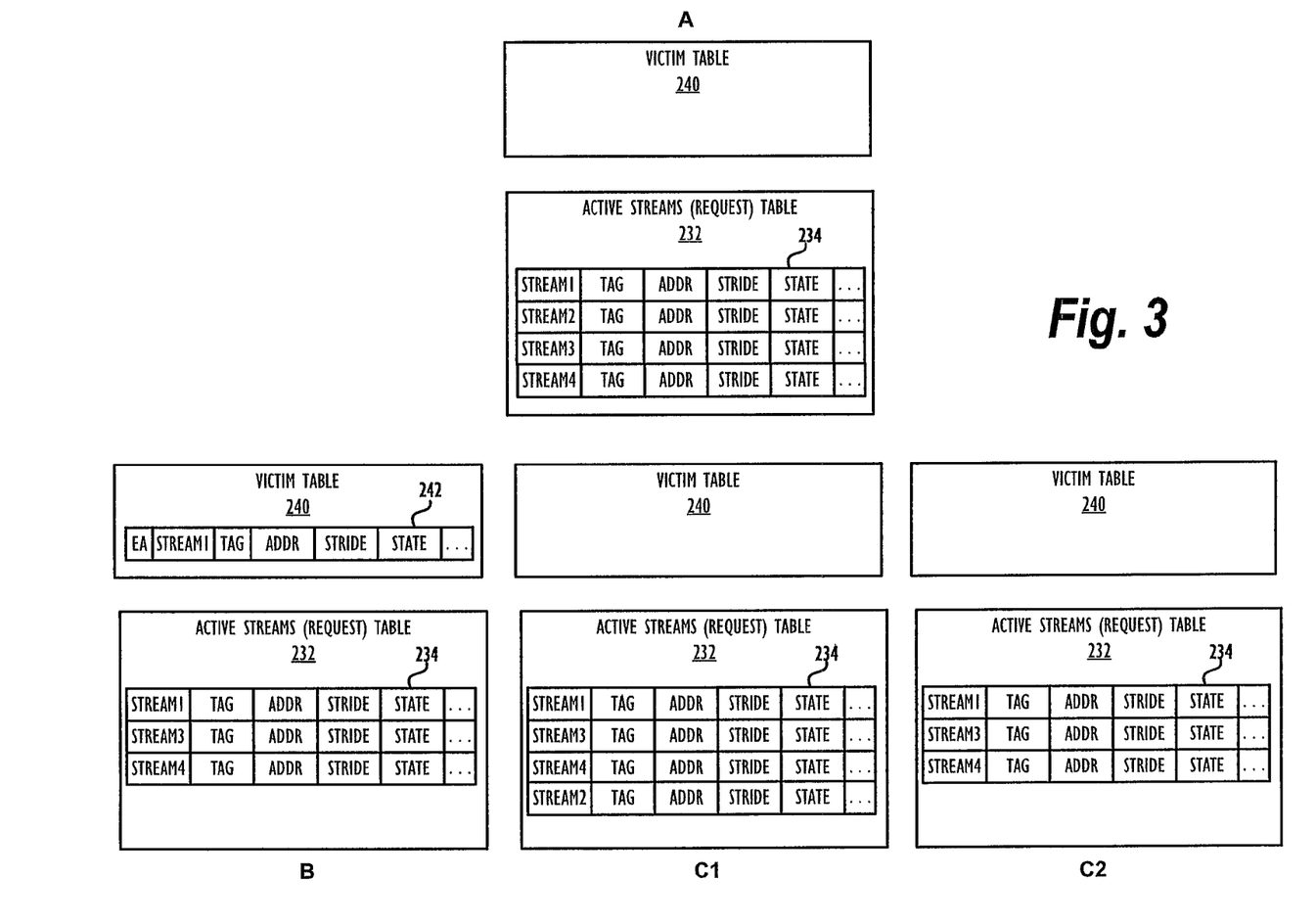
FIG. 3 provides a series of block diagrams representing different views of the stream allocation within the active streams table and the victim table during stream prefetching that encounters a memory page boundary, according to one embodiment.

FIG. 3 provides a sequence of table allocations, which illustrates movement (performed by RAPC logic 305) of stream information across the active streams table and the victim table of an example stream, Stream2, when the next real address of Stream2 crosses the memory page boundary. The table allocations and changes thereto are provided in alphabetic sequence (A, B, C), corresponding to time periods (a) before encountering a memory page boundary, (b) when the memory page boundary is initially encountered, and (c) following a check of the stream's effective address against the next effective address of subsequently-issued processor demands for data. The description of the table allocations provided by FIG. 3 will best be understood when described along with the scheduling method provided by the PE 120, which method is illustrated by the flow chart of FIG. 4.

Figure 4:
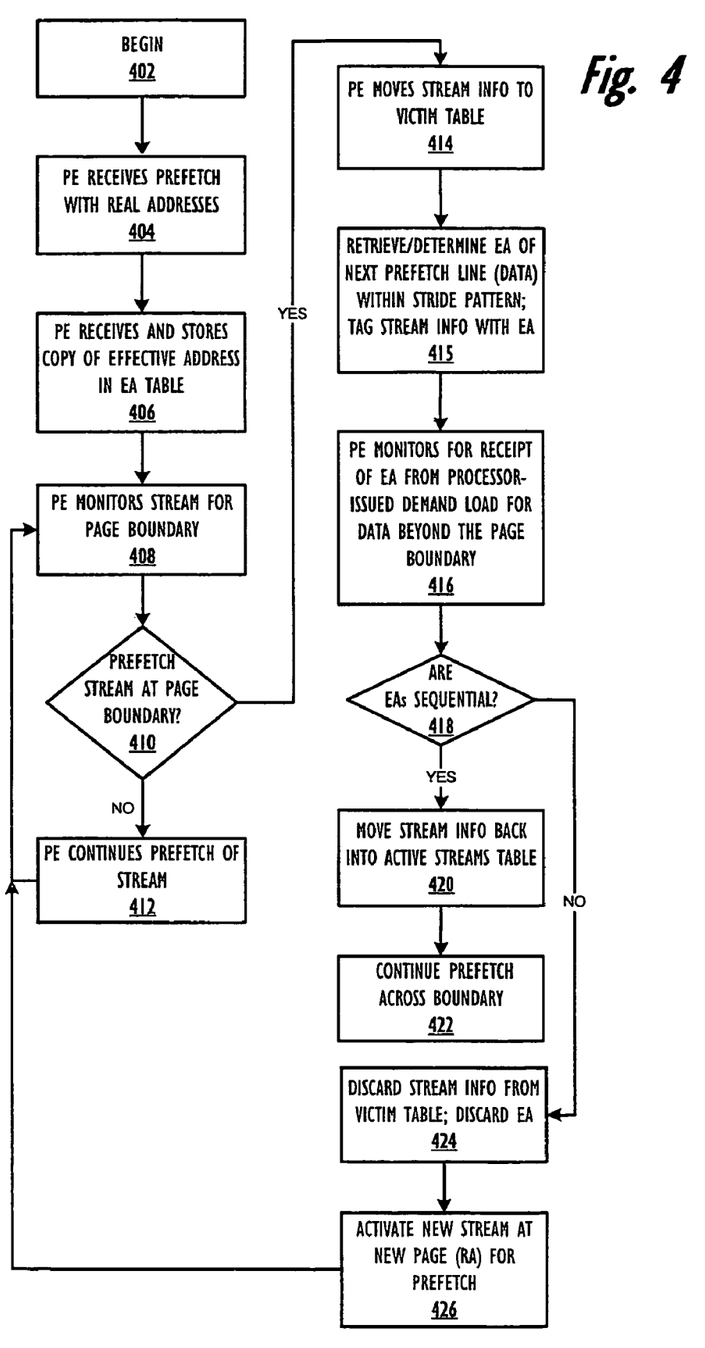
FIG. 4 is a high level logical flowchart of the method for jump stating stream prefetching across a memory page boundary, in accordance with the described embodiments.

In the described embodiment, several of the functionality provided by the method are implemented by scheduling logic 210 and/or RAPC logic 205 operating/executing within PE 120. However, for simplicity, the method is generally described from the perspective of the PE 120, which encompasses both of the logic components, tables, queues and other components/devices illustrated and described herein.

Turning now to FIG. 4, the method begins at block 402 and proceeds to block 404 at which the PE receives a prefetch instruction (or memory access command) with real addresses from the TLB to perform a data prefetch from memory. The PE 120 also receives the effective address of the prefetch instruction (memory access command) from the CPU 105 and places the effective address in the EA table 207, as provided at block 406. The PE 120 establishes/detects a prefetch stream, places the stream information within the active streams table 232 and schedules the prefetch stream, as shown at block 407. Table allocation A illustrates the PE with four prefetch stream entries 234 within active streams table 232. Notably, no entry currently exists within victim table 240.

At block 408, the PE (logic) monitors the stream execution relative to the known/pre-identified memory page boundary for that stream. At block 410, the PE 120 determines whether the next sequential real address within a prefetch stream crosses the memory page boundary. If the next address does not cross the memory page boundary, the PE 120 continues to execute the stream prefetch, as shown at block 412. The PE's execution of the prefetch stream continues as scheduled until the processor terminates the stream or the stream encounters a page boundary.

However, if, at decision block 410, the stream does encounter a page boundary, the PE 120 moves the particular stream (Stream2) out of the active streams table 232 and into the victim table 240, as provided at block 414. This movement results in table allocation B of FIG. 3, which shows Stream2 information 242 moved to the victim table 240. At block 415, the PE 120 also retrieves the effective address of the stream's prefetch from the EA table, determines the next EA corresponding to the EA of the last prefetch (before the page boundary) plus the stride pattern of the stream, and tags the stream information with the EA. With the stream information moved to the victim table and the next EA determined (for the next prefetch across the page boundary) that would have been calculated for the stream), the PE 120 monitors for receipt of the EA corresponding to the next processor-issued demand for data with an EA sequentially after the previous page's EAs, as shown at block 416.

Following, at block 418, the PE 120 determines whether the EAs are the same. If the EAs are the same, indicating that the data for the new memory page can be prefetched with the same, previously active stream, the PE 120 moves the stream information from the victim table 240 back into the active streams table 232, as shown at block 420. The PE (scheduling logic) then continues prefetching data from the new memory page using the same, previously established stream. Table allocation C1 of FIG. 3 illustrates the move by the PE of Stream2 information 242 from the victim table 240 to the active stream table 232.

Notably, in the illustration of FIG. 3, the Stream 2 information 242 is placed at the end of the active streams table, making Stream2 the newest stream for scheduling. However, it is contemplated that in certain embodiments, Stream2 may be provided a "high" priority relative to the other streams, since the stream was paused while waiting on confirmation of the prefetch of data from the new page and the demand for that stream's data has caught up with the stream. The location within the active streams queue is therefore not indicative of when or how often Stream2 will be subsequently schedule in order to catch up with the prefetch of data to satisfy subsequent demand loads of the processor. The embodiments may therefore provide mechanisms by which the PE ensures the "resumed" active stream quickly falls into step of prefetching data ahead of the time the demand load is received for the data of that stream.

Returning to FIG. 4, if the EAs are not sequential, the PE 120 discards the stream information from the victim table 240, as shown at block 424. The PE also discards the stream's EA from the EA table 207. Table allocation C2 illustrates the tables with Stream2 discarded. Additionally, as provided at block 426, the PE subsequently detects and activates a new stream to prefetch data requested by the same thread of execution at the correct memory page.

Thus, with the above described functionality of the illustrative embodiments, the PE 120 jumpstarts the prefetching of a stream across a page boundary. Notably, the stream information within the victim table 240 has an EA tag in addition to the real address. Also, in one embodiment, the PE 120 factors in the stride pattern of the stream. Thus, when the stride pattern is not singular (i.e., +1), the PE's determination of the next EA adds the stride pattern to the last EA of the stream prefetch before encountering the page boundary. The result of the comparison yields a positive only when a subsequent effective address of a demand load matches the sum of the stream's last effective address plus the stream's stride. When this result is positive, the stream is immediately moved back into the active streams table. The described embodiments save the start-up cost for initializing a new stream and also remove the cost associated with stopping and discarding a stream because the stream has continued across the page boundary.

It is important to note that although the present invention has been described in the context of a data processing system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. In data processing system comprising a processor, and a memory subsystem with at least one cache and a memory configured with memory pages for storing data, a method comprising:

issuing a prefetch request of a first prefetch stream to fetch one or more data from the memory subsystem, wherein the prefetch request has a first real address corresponding to a memory location within a first memory page;

determining when a next prefetch request of the first prefetch stream targets a next real address that crosses a page boundary of the first memory page, wherein the next prefetch targets data on a next sequential memory page;

moving the first prefetch stream from an active streams table to a second table, wherein prefetch streams are scheduled to be issued when within the active streams table and are not scheduled when in the second table; and in response to an effective address of a subsequent memory access instruction being equal to a next effective address corresponding to the next real address, automatically reinserting the first prefetch stream into the active streams table from the second table.

2. The method of claim 1, further comprising subsequently scheduling and issuing the next prefetch request within the first prefetch stream to continue prefetching data from the next sequential memory page.

3. The method of claim 2, wherein said automatically reinserting comprises:

reinserting the first prefetch stream with a scheduling priority that enables the data of the first prefetch stream to arrive at the cache at a time the data is demanded by the processor.

4. The method of claim 3, further comprising:

assigning a first scheduling priority to the first prefetch stream; and dynamically changing the first scheduling priority by completing one of:

deterministically changing the first scheduling priority by a priority count that correlates to the amount of time elapsed between the return of the data and the receipt of the demand load from the processor, wherein a larger time results in a larger change in the first scheduling priority; and increasing the first scheduling priority after one of: (a) the return of data following the demand load has occurred more than a first preset sequential number of times for the prefetch stream; and (b) the return of data more than the minimum amount of time before receiving the demand load has occurred more than a second preset sequential number of times for the prefetch stream.

5. The method of claim 1, wherein in response to an effective address of a subsequent memory access instruction not being equal to a next effective address corresponding to the next real address, said method further comprises:

automatically discarding the first prefetch stream from the second table; and initiating a new stream to prefetch data from the real address corresponding to the effective address of the subsequent memory access instruction.

6. The method of claim 1, further comprising:

receiving the first prefetch request from the processor with a real address of a first memory location from which to retrieve data;

receiving the effective address corresponding to the real address;

storing the effective address;

evaluating and storing a stride length for the first prefetch stream; and determining what next effective address would cross the page boundary by adding the stride length to the last prefetch request that occurs within the first memory page.

7. The method of claim 6, further comprising:
while the first prefetch stream is within the second queue, comparing each subsequently received effective address of processor issued memory access operations with the next effective address.

8. A data processing system comprising:
a central processing unit that issues requests for data;
a memory subsystem having at least one cache that stores data and a lower level memory configured with memory pages accessible via real addresses;
a prefetch engine associated with the central processing unit and which includes:
an active streams table in which information for one or more prefetch streams that are scheduled for prefetching operations are stored;
logic for scheduling the one or more prefetch streams to return data from the lower level memory to the cache, said logic comprising logic for issuing a prefetch request of a first prefetch stream to fetch one or more data from the lower level memory, wherein the prefetch request has a first real address corresponding to a memory location within a first memory page; and
logic, responsive to detecting that a next sequential prefetch request of the first prefetch stream crosses a page boundary of the first memory page, for automatically jump starting a continuation of the first prefetch stream following a determination that the first prefetch stream is to continue to retrieve data from a next page located across the page boundary of the first memory page.

9. The data processing system of claim 8, wherein the prefetch engine further comprises:
a second table for temporarily storing stream information for a stream whose prefetch reaches a memory page boundary; and
wherein said logic for automatically jump starting the continuation of the first prefetch stream comprises:
logic for determining when a next prefetch request of the first prefetch stream targets a next real address that crosses a page boundary of the first memory page, wherein the next prefetch targets data on a next sequential memory page;
logic for moving the first prefetch stream from an active streams table to the second table, wherein prefetch streams are scheduled to be issued when within the active streams table and are not scheduled when in the second table; and
in response to an effective address of a subsequent memory access instruction being equal to a next effective address corresponding to the next real address, logic for automatically reinserting the first prefetch stream into the active streams table from the second table.

10. The data processing system of claim 8, wherein said prefetch engine further comprises logic for subsequently scheduling and issuing the next prefetch request within the first prefetch stream to continue prefetching data from the next sequential memory page.

11. The data processing system of claim 10, wherein said logic for automatically reinserting comprises logic for reinserting the first prefetch stream with a scheduling priority that enables the data of the first prefetch stream to arrive at the cache at a time the data is demanded by the processor.

12. The data processing system of claim 11, wherein said prefetch engine further comprises:
logic for assigning a first scheduling priority to the first prefetch stream; and
logic for dynamically changing the first scheduling priority by completing one of:
deterministically changing the first scheduling priority by a priority count that correlates to the amount of time elapsed between the return of the data and the receipt of the demand load from the processor, wherein a larger time results in a larger change in the first scheduling priority; and
increasing the first scheduling priority after one of: (a) the return of data following the demand load has occurred more than a first preset sequential number of times for the prefetch stream; and (b) the return of data more than the minimum amount of time before receiving the demand load has occurred more than a second preset sequential number of times for the prefetch stream.

13. The data processing system of claim 8, wherein the prefetch engine further comprises:
logic for, when an effective address of a subsequent memory access instruction is not equal to a next effective address corresponding to the next real address:
automatically discarding the first prefetch stream from the second table; and
initiating a new stream to prefetch data from the real address corresponding to the effective address of the subsequent memory access instruction.

14. The data processing system of claim 13, wherein:
said prefetch engine further comprises an effective address (EA) table; and
wherein said logic for storing includes logic for storing the EA within the EA table.

15. The data processing system of claim 8, wherein the prefetch engine further comprises:
logic for receiving the first prefetch request from the processor with a real address of a first memory location from which to retrieve data;
logic for receiving the effective address corresponding to the real address;
logic for storing the effective address;
logic for evaluating and storing a stride length for the first prefetch stream;
logic for determining what next effective address would cross the page boundary by adding the stride length to the last prefetch request that occurs within the first memory page; and
logic for comparing each subsequently received effective address of processor issued memory access operations with the next effective address, while the first prefetch stream is within the second queue.

16. A computer program product comprising:
a non-transitory computer storage medium; and
program code on the non-transitory computer storage medium that when executed within a processing system completes the functions of:
issuing a prefetch request of a first prefetch stream to fetch one or more data from the memory subsystem, wherein the prefetch request has a first real address corresponding to a memory location within a first memory page;
determining when a next prefetch request of the first prefetch stream targets a next real address that crosses a page boundary of the first memory page, wherein the next prefetch targets data on a next sequential memory page;

moving the first prefetch stream from an active streams table to a second table, wherein prefetch streams are scheduled to be issued when within the active streams table and are not scheduled when in the second table;

in response to an effective address of a subsequent memory access instruction being equal to a next effective address corresponding to the next real address, automatically reinserting the first prefetch stream into the active streams table from the second table; and subsequently scheduling and issuing the next prefetch request within the first prefetch stream to continue prefetching data from the next sequential memory page.

17. The computer program product of claim 16, wherein said program code for automatically reinserting comprises code for:

assigning a first scheduling priority to the first prefetch stream that enables the data of the first prefetch stream to arrive at the cache at a time the data is demanded by the processor;

reinserting the first prefetch stream with the first scheduling priority; and dynamically changing the first scheduling priority by completing one of:

deterministically changing the first scheduling priority by a priority count that correlates to the amount of time elapsed between the return of the data and the receipt of the demand load from the processor, wherein a larger time results in a larger change in the first scheduling priority; and increasing the first scheduling priority after one of: (a) the return of data following the demand load has occurred more than a first preset sequential number of times for the prefetch stream; and (b) the return of data more than the minimum amount of time before receiving the demand load has occurred more than a second preset sequential number of times for the prefetch stream.

18. The computer program product of claim 16, wherein in response to an effective address of a subsequent memory access instruction not being equal to a next effective address corresponding to the next real address, said program code further comprises code for:

automatically discarding the first prefetch stream from the second table; and initiating a new stream to prefetch data from the real address corresponding to the effective address of the subsequent memory access instruction.

19. The computer program product of claim 16, further comprising program code for:

receiving the first prefetch request from the processor with a real address of a first memory location from which to retrieve data;

receiving the effective address corresponding to the real address;

storing the effective address;

evaluating and storing a stride length for the first prefetch stream;

determining what next effective address would cross the page boundary by adding the stride length to the last prefetch request that occurs within the first memory page; and while the first prefetch stream is within the second queue, comparing each subsequently received effective address of processor issued memory access operations with the next effective address.

20. A processor comprising:

one or more processing units that issue requests for data;

a Level 1 (L1) cache for storing data received during data processing; a prefetch engine associated with the processing units and which includes:

an active streams table in which information for one or more prefetch streams that are scheduled for prefetching operations are stored;

logic for scheduling the one or more prefetch streams to return data from the lower level memory to the cache, said logic comprising logic for issuing a prefetch request of a first prefetch stream to fetch one or more data from the lower level memory, wherein the prefetch request has a first real address corresponding to a memory location within a first memory page; and logic, responsive to detecting that a next sequential prefetch request of the first prefetch stream crosses a page boundary of the first memory page, for automatically jump starting a continuation of the first prefetch stream following a determination that the first prefetch stream is to continue to retrieve data from a next page located across the page boundary of the first memory page.

21. The processor of claim 20, wherein the prefetch engine further comprises:

a second table for temporarily storing stream information for a stream whose prefetch reaches a memory page boundary; and wherein said logic for automatically jump starting the continuation of the first prefetch stream comprises:

logic for determining when a next prefetch request of the first prefetch stream targets a next real address that crosses a page boundary of the first memory page, wherein the next prefetch targets data on a next sequential memory page;

logic for moving the first prefetch stream from an active streams table to the second table, wherein prefetch streams are scheduled to be issued when within the active streams table and are not scheduled when in the second table;

in response to an effective address of a subsequent memory access instruction being equal to a next effective address corresponding to the next real address, logic for automatically reinserting the first prefetch stream into the active streams table from the second table; and logic for subsequently scheduling and issuing the next prefetch request within the first prefetch stream to continue prefetching data from the next sequential memory page.

22. The processor of claim 21, wherein said logic for automatically reinserting comprises logic for reinserting the first prefetch stream with a scheduling priority that enables the data of the first prefetch stream to arrive at the cache at a time the data is demanded by the processor.

23. The processor of claim 20, wherein said prefetch engine further comprises:

logic for, when an effective address of a subsequent memory access instruction is not equal to a next effective address corresponding to the next real address:

automatically discarding the first prefetch stream from the second table; and initiating a new stream to prefetch data from the real address corresponding to the effective address of the subsequent memory access instruction.

24. The processor of claim 20, wherein the prefetch engine further comprises:

logic for receiving the first prefetch request from the processor with a real address of a first memory location from which to retrieve data;

logic for receiving the effective address corresponding to the real address;

logic for storing the effective address;

logic for evaluating and storing a stride length for the first prefetch stream;

logic for determining what next effective address would cross the page boundary by adding the stride length to the last prefetch request that occurs within the first memory page; and logic for comparing each subsequently received effective address of processor issued memory access operations with the next effective address, while the first prefetch stream is within the second queue.

25. The processor of claim 20, wherein:

said prefetch engine further comprises an effective address (EA) table; and wherein said logic for storing includes logic for storing the EA within the EA table.

\* \* \* \* \*